June 2, 1942.     N. I. KORMAN     2,285,211
RADIO FREQUENCY WATTMETER
Filed Sept. 28, 1940
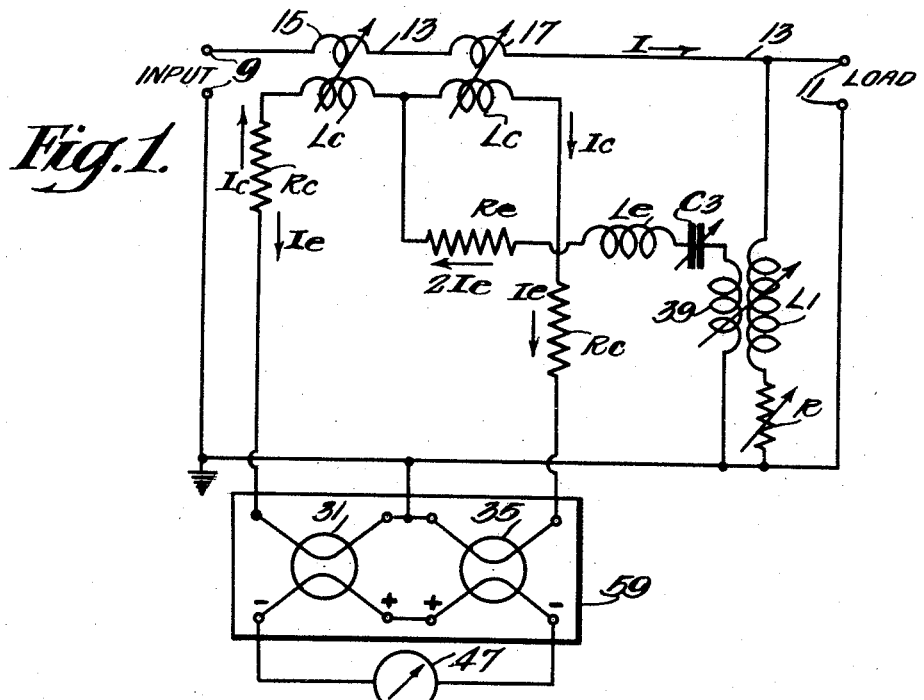
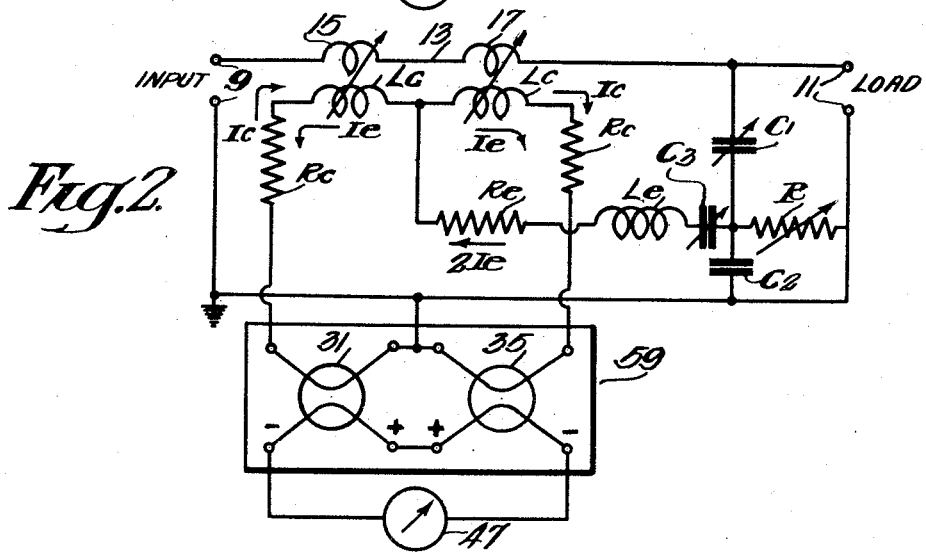
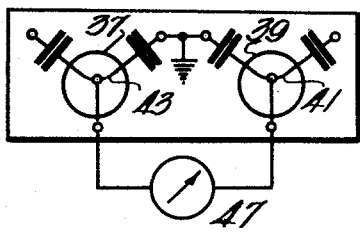
Inventor
Nathaniel I. Korman Patented June 2, 1942

2,285,211

UNITED STATES PATENT OFFICE 2,285,211

RADIO FREQUENCY WATTMETER

Nathaniel I. Korman, Haddon Heights, N. J., assignor to Radio Corporation of America, a corporation of Delaware Application September 28, 1940, Serial No. 358,793

7 Claims. (Cl. 171—95)

This invention relates to electrical power measuring devices, and particularly to an improved radio frequency wattmeter of the type disclosed in a copending application of George H. Brown, Serial No. 327,400, filed April 2, 1940, and assigned to the same assignee of the present application.

The general arrangement employed in wattmeters of the type under discussion comprises means for energizing a pair of serially connected current responsive devices by two radio frequency currents. The first current is substantially in phase with and proportional in amplitude to the current which is to be measured, while the second current is substantially in phase with and proportional to the voltage applied to the load. The two currents are combined so as to produce an indication which is proportional to the power delivered to the load. The particular invention involved in the present application relates to improvements in the method of deriving currents corresponding to the voltage applied to the load, and the method of adjusting the phase of the derived currents, so that a more accurate wattmeter is produced. In addition, the present invention makes possible a more economical indicator, both as to initial cost and as to the space required for the apparatus.

Among the desirable features of the invention are the following: The meter is direct reading; it utilizes a direct current indicator which may be located at a considerable distance from the meter; it may be readily calibrated; its calibration is independent of frequency; it operates without appreciable error with loads having widely different power factors; it is conveniently adapted for use over a wide range of frequencies; it requires no external power supply; and it consumes a minimum amount of power from the line when in operation.

In brief the improved wattmeter of the present invention differs from that described in the Brown application referred to above in that the coupling transformer utilized to provide a current proportional to the line voltage is replaced by a capacitive voltage divider connected across the line. In addition, a phasing means is connected in circuit with the capacitive voltage divider, or in circuit with the transformer of the earlier device referred to above, which when adjusted to a particular value makes possible a more accurate calibration of the instrument.

This invention will be better understood from the following description when considered in connection wtih the accompanying drawing, in which Figure 1 is a schematic diagram of an embodiment of this invention; Figure 2 is a schematic diagram of an alternative embodiment of this invention; and Figure 3 is a schematic diagram illustrating the use of contact thermocouples in a wattmeter of the character described. Similar reference numerals refer to similar parts throughout the several figures of the drawing.

Referring to Fig. 1 the wattmeter is provided with input terminals 9 and output terminals 11, the former being connected to a source of power, such as a radio transmitter, and the latter being connected to a load, such as an antenna, or the like, whose power consumption is to be measured. One input and one output terminal is shown grounded, but it is to be understood that this is not necessarily an actual ground connection, but may be the ground of the system only. By means of these terminals the meter is inserted in the transmission line supplying power to the load. A conductor 13 is connected betwen the ungrounded input and output terminals. This conductor is preferably a copper tube or other low resistance conductor, and is bent so as to form two suitably spaced one or two turn line current coils 15 and 17 through which the entire line current flows. Alternately, separate coils may be used. The reactance of these coils is negligible at the operating frequency, and the series resistance of the conductor is also negligible so that the power loss in the meter is likewise negligible. These coils 15 and 17 constitute coupling means for coupling the remainder of the circuit to the power line. A pair of current pickup coils $L_c$, $L_c$ are variably coupled to the respective line current coils. A pair of current responsive devices such as two vacuum thermocouples 31 and 35 are connected in series circuit with the two current pickup coils $L_c$, $L_c$. Resistors $R_c$ in series with this circuit represent the resistance of the coils and conductors and thermocouples plus additional resistors which may be connected in the circuit. The junction point of the thermocouple heater elements is connected to ground. The output terminals of the two thermocouple elements are connected in series opposition and supply a direct current to a D. C. meter 41 which is calibrated to indicate the power consumption.

The voltage responsive portion of the circuit, that is, the portion which derives a current in phase with and proportional to the amplitude of the line voltage, comprises an inductor $L$ and a resistor $R$ serially connected across the line. If desired, the inductor $L$ may be shunted by a capacitor and tuned to resonance at the operating frequency. A voltage pickup coil 39 is adjustably coupled to coil Ll. One terminal of this coil is connected to ground while the other terminal is connected to the electrical mid-point of the current pickup coils Lc, Lc through a series circuit which includes an inductor Le, and a variable capacitor C3, the latter being adjusted to that value which tunes the circuit elements to series resonance at the operating frequency. The circuit also includes a resistance Re, which is comprised of the inherent resistance of the coils in the series circuit plus an actual inserted resistor. It is to be understood that these elements may be connected in any order, and that the coils Lc, Lc may be combined to form a single coil having an adjustable mid-contact for connection to the series circuit.

The thermocouple unit 59 is adjusted prior to its connection in the wattmeter circuit. To accomplish this, the thermocouple heaters are connected in series to any available source of direct or alternating current, preferably a current of the operating radio frequency, and the output meter connected between the two output terminals of like polarity. If the two thermocouples are exactly equal the output meter reading will be zero for all values of applied current. If this is not the case, however, it is necessary to adjust one or the other thermocouple until this condition is achieved. This adjustment is accomplished by connecting a resistor across the couple which is delivering the greatest voltage. The meter is then ready for use and may be connected to the remainder of the instrument. It will also be appreciated that the present wattmeter may be calibrated in a manner described in the aforementioned Brown application. However, the meter may be initially calibrated by a comparison method in which the indicated output is compared over its range to the reading of a standard wattmeter connected in the same circuit.

As pointed out above the current circuit or loop including the pickup coils Lc, Lc and the thermocouple heaters has a certain amount of inherent resistance Rc. If kept to a minimum only a small shift in the phase of the current Ic flowing in this circuit is produced by this resistance. However, it will be appreciated that any finite value of resistance will produce some phase shift in this current. The output indication is directly dependent upon the phase relation of the current Ic produced by the current pickup coils Lc, Lc and the voltage-derived current Ie produced by the voltage pickup coil 39. If the voltage-derived current Ie is shifted in phase an amount equal to the phase shift produced in the current-derived current Ic, the relative phase relation of the two currents will be restored to the correct value. To accomplish this, in accordance with the present invention, the resistor R in series with the voltage coil Ll is adjusted to a value which is determined by the following equation:

$$\frac{R}{\omega Ll} = \frac{Rc}{\omega Lc}$$

where the components are those indicated in Fig. 1 of the drawing.

Stated in other words, this equation indicates that the ratios of resistance to reactance in the current loop or circuit and in the voltage circuit are equal, and hence that the phase shifts produced in the two circuits are likewise equal.

Referring now to Fig. 2 a modification is illustrated in which the coupling transformer embodying inductors Ll and 39 has been replaced by a capacitive voltage divider comprising capacitors C1 and C2. Either one or both of these capacitors may be made variable or their value may be preselected so as to produce a voltage at their junction point of the desired value. The junction point of the two capacitors above named is connected through a series resonant circuit including capacitor C3, inductor Le and resistance Re, which may be the inherent resistance of the inductor, to the electrical midpoint or junction of the two current pickup coils Lc, Lc, or the equivalent midtap on a single pickup coil. A resistor R is preferably connected across capacitor C2 in order to adjust the phase angle of the circuit.

It will be observed that two current loops or paths are provided, as in the preceding figure. The current Ic, induced by the current pickup coils Lc flows through the two thermocouple heater elements in the same direction. The current 2Ie flows through the series connection from the voltage divider and then divides at the midpoint of the current pickup coils and flows through parallel paths and in opposite directions through the two thermocouple heaters. I have found that when the line voltage and current are in phase the current 2Ie is in phase with the current Ic so that the deflection D of the output meter 47 is determined in accordance with the following equation:

$$D = K[(Ic - Ie)^2 - (Ic + Ie)^2] = 2KIcIe$$

where K is a calibration constant. Since these currents are proportional to the amplitudes of the line current and line voltage, respectively, and of corresponding phase, the output meter indicates the power flowing in the transmission line. This relation has been derived in detail for a similar circuit in the Brown application, in which the derivation is set forth.

As before, the accuracy of the meter depends upon the two current loops having substantially identical characteristics with respect to the phase shift produced on the currents flowing therein. Since the current loop will always have a finite resistance there will be a small phase shift between the line current and the current Ic flowing in the current loop. In order to compensate for this phase shift resistance means is included in circuit with the voltage divider for adjusting the phase of the voltage produced thereby so that the combined currents will then be in exactly the correct phase relation. The resistance R connected across capacitor C2 performs this function. The proper value for this resistance R may be obtained from the following equation:

$$\frac{Rc}{\omega Lc} = \frac{1}{R\omega(C1 + C2)}$$

It will be observed from this equation that when properly adjusted the ratio of the resistance to the reactance of the current loop is equal to the reciprocal of the product of the phasing resistor and the sum of the capacitors constituting the voltage divider.

In Figs. 1 and 2, as well as in the circuit arrangement of the wattmeter of the Brown application, insulated thermocouples have been used. It is not practical to substitute the conventional four-terminal contact type thermocouple in this circuit since part of the thermocouple heater elements would be short circuited. Contact type thermocouples, however, are desirable since they usually are more sensitive than the insulated thermocouples. I have found that three-terminal contact type thermocouples may be utilized in connection with meters of the type under discussion by connecting them in the manner illustrated in Fig. 3 to which reference is now made.

Two three-terminal thermocouples 37 and 39 have their heater elements 41 and 43 serially connected in the current loop. Each thermocouple is provided with a third terminal which is connected within the tube to the heater to constitute the couple. The output meter 47 is connected between the two output terminals of the two thermocouples as illustrated in Fig. 3. Since equal voltages, with respect to ground, are developed by the two thermocouples when a given current is flowing through both heater elements, it will be appreciated that the output indication is proportional to the difference between the outputs of the two thermocouples. Consequently, the arrangement illustrated functions in the same manner as the four-terminal couples illustrated in the preceding figures, but it has the advantage of greater sensitivity by reason of the closer coupling between the heater element and the couple.

I have thus described an improved radio frequency wattmeter which includes means for increasing the accuracy of indication over that previously obtainable, which is more economical to construct, and which may be built into a smaller unit by reason of the elimination of the coupling transformer and the substitution therefor of a small capacity voltage divider.

I claim as my invention:

1. A radio frequency wattmeter comprising coupling means for connection in series with a radio frequency power circuit energizing a load, current pickup means coupled to said coupling means, a pair of current responsive devices connected in series with said pickup means, said series connection including resistance and inductance, capacitive voltage pickup means connected across said power circuit, a resistor for adjusting the phase of the voltage developed by said capacitive voltage pickup means, a circuit for applying said voltage between a point intermediate the ends of said current pickup means and a point intermediate said pair of current responsive devices, the phases of said voltage pickup circuit and said current pickup circuit being adjusted to equality.

2. A radio frequency wattmeter comprising a pair of serially connected inductors, means for coupling said inductors to one line of a power circuit energizing a load, a pair of current responsive devices connected in series with said inductors, said series connection including resistance, a pair of capacitors serially connected across said line, a phase adjusting resistor in shunt with one of said capacitors, means connecting the junction point of said capacitors to the junction point of said serially connected inductors, a connection between the other of said lines and the junction point of said current responsive devices, and means for indicating the difference between said current responsive devices.

3. A radio frequency wattmeter comprising a pair of serially connected inductors, means for coupling said inductors to one line of a power circuit energizing a load, a pair of thermocouples having their heaters connected in series with said inductors, said series connection including resistance, a pair of capacitors serially connected across said line, a phase adjusting resistor in shunt with one of said capacitors, means connecting the junction point of said capacitors to the junction point of said serially connected inductors, a connection between the other of said lines and the junction point of said thermocouples, and means for indicating the difference between the outputs of said thermocouples.

4. A radio frequency wattmeter comprising coupling means for connection in series with a radio frequency power circuit energizing a load, current pickup means coupled to said coupling means, a pair of current responsive devices connected in series with said pickup means, voltage pickup means connected across said line, means in circuit with said voltage pickup means for adjusting the phase of said voltage, and means for combining currents derived from said voltage pickup means in phase in one of said responsive devices and in phase opposition in the other of said responsive devices with currents derived from said current pickup means, and an indicator responsive to the difference of the outputs of said responsive devices.

5. A radio frequency wattmeter comprising means including a first circuit for deriving a first current proportional in amplitude to current in a line energizing a load, a second circuit including reactance means connected across said line for deriving a second current proportional in amplitude to the voltage of said line, means for equalizing the ratios of resistance to reactance in said circuits, a pair of current responsive devices, means for passing said first and second currents in phase through one of said devices, means for passing said first and second currents in phase opposition through the other of said devices, and an indicator responsive to the difference between the outputs of said devices.

6. A device of the character described in claim 5 in which said current responsive devices comprise thermocouple elements.

7. A device of the character described in claim 2 in which said means connecting the junction point of said capacitors to the junction point of said serially connected inductors comprises a series resonant circuit at the operating frequency.

NATHANIEL I. KORMAN.